United States Patent
Chou et al.

(10) Patent No.: US 10,237,582 B2
(45) Date of Patent: Mar. 19, 2019

(54) VIDEO STREAM PROCESSING METHOD AND VIDEO STREAM DEVICE THEREOF

(71) Applicant: VIVOTEK INC., New Taipei (TW)

(72) Inventors: Ming-Hao Chou, New Taipei (TW); Kuo-Yeh Hsieh, New Taipei (TW)

(73) Assignee: VIVOTEK INC., New Taipei (TW)

( * ) Notice: Subject to any disclaimer, the term of this patent is extended or adjusted under 35 U.S.C. 154(b) by 0 days.

(21) Appl. No.: 15/896,014

(22) Filed: Feb. 13, 2018

(65) Prior Publication Data

US 2018/0242025 A1    Aug. 23, 2018

(30) Foreign Application Priority Data

Feb. 17, 2017 (TW) .............................. 106105235 A

(51) Int. Cl.
*H04N 21/2662* (2011.01)
*H04N 21/234* (2011.01)
*H04N 21/2343* (2011.01)
*H04N 21/24* (2011.01)

(52) U.S. Cl.
CPC ....... *H04N 21/234* (2013.01); *H04N 21/2343* (2013.01); *H04N 21/2405* (2013.01); *H04N 21/2662* (2013.01)

(58) Field of Classification Search
CPC .. H04N 21/23655; H04N 21/234; H04N 7/26; H04N 21/2343; H04N 21/2662
See application file for complete search history.

(56) References Cited

U.S. PATENT DOCUMENTS

| | | | | |
|---|---|---|---|---|
| 2003/0064744 A1* | 4/2003 | Zhang | ................... | H04W 52/20 455/522 |
| 2004/0234145 A1* | 11/2004 | Yatabe | ................. | H04N 19/197 382/239 |
| 2005/0063314 A1* | 3/2005 | Sahinoglu | ......... | H04L 29/06027 370/252 |
| 2013/0034146 A1* | 2/2013 | Jeong | ..................... | H04N 7/147 375/240.01 |
| 2015/0381980 A1* | 12/2015 | Tsuchiya | .............. | H04N 19/176 375/240.02 |

FOREIGN PATENT DOCUMENTS

| | | |
|---|---|---|
| TW | 201440493 A | 10/2014 |
| TW | 201501488 A | 1/2015 |

OTHER PUBLICATIONS

R. Krishnamurthy, Sudhakar Yalamanchili, Karsten Schwan and Richard West, Architecture and Hardware for Scheduling Gigabit Packet Streams, Proceedings of the 10TH Symposium on High Performance Interconnects Hot Interconnects(Hotl'02), 2002.

* cited by examiner

*Primary Examiner* — Junior O Mendoza
(74) *Attorney, Agent, or Firm* — Winston Hsu

(57) ABSTRACT

A video stream processing method is suitable for a video stream device having an encoder for generating a plurality of video streams. The video stream processing method includes receiving image data, setting a priority of each video stream, setting an effective stream parameter of each video stream according to the priority of each video stream, a predetermined stream parameter of each video stream and an encoding power of the encoder, and encoding the image data according to the effective stream parameter of each video stream for generating the plurality of video streams.

14 Claims, 3 Drawing Sheets

VIDEO STREAM PROCESSING METHOD AND VIDEO STREAM DEVICE THEREOF

BACKGROUND OF THE INVENTION

1. Field of the Invention

The present invention relates to a video stream processing method and a video stream device thereof, more specifically, a video stream processing method for dynamically adjusting an effective stream parameter of each video stream according to a priority of each video stream and a video stream device thereof.

2. Description of the Prior Art

In general, a camera device for surveillance (e.g. IP camera) adopts a video streaming method to transmit real-time streaming to a control terminal (e.g. centralized monitor) for achieving the real-time surveillance purpose. In practical application, the camera device usually transmits multiple video streams and allows that a user could configure parameters (e.g. video resolution or frame rate) of a video stream to satisfy the individual surveillance requirement. Furthermore, the camera device could also allow one single user or plural users to watch video streams with different stream settings at the same time.

However, during providing the video streams with different stream settings at the same time, the camera device could not provide real-time video streams matching the stream parameters predetermined by the user. The reason is that the required encoding power of these video streams is larger than the maximum encoding power of the camera device. The aforesaid problem could be solved by equal allocation of the encoding power of the camera device for evenly reducing the stream parameter of each video stream. This method might cause a predetermined stream parameter of a video stream with high importance (e.g. a surveillance video stream monitors a region of interest) to be greatly reduced due to interference of other video streams with low importance, so as to influence the image quality of the video stream with high importance. Accordingly, it brings user much inconvenience and limitations in watching the video stream with high importance.

SUMMARY OF THE INVENTION

The present invention provides a video stream processing method suitable for a video stream device. The video stream device has an encoder for generating a plurality of video streams. The video stream processing method includes the following features: 1. receiving image data; 2. setting a priority of each video stream; 3. setting an effective stream parameter of each video stream according to the priority of each video stream, a predetermined stream parameter of each video stream, and an encoding power of the encoder; and 4. encoding the image data according to the effective stream parameters of each video stream for generating the plurality of video streams.

The present invention further provides a video stream device. The video stream device includes a receiver, an encoder, and a priority setting unit. The receiver is used for receiving an image data. The encoder is used for generating a plurality of video streams. The priority setting unit is used for setting a priority of each video stream. The encoder is coupled to the receiver and the priority setting unit. The encoder sets an effective stream parameter of each video stream according to the priority of each video stream, a predetermined stream parameter of each video stream, and an encoding power of the encoder. The encoder encodes the image data according to the effective stream parameter of each video stream for generating the plurality of video streams.

These and other objectives of the present invention will be obvious after reading the following detailed description of the preferred embodiment that is illustrated in the various figures and drawings.

DETAILED DESCRIPTION

Figure 1:
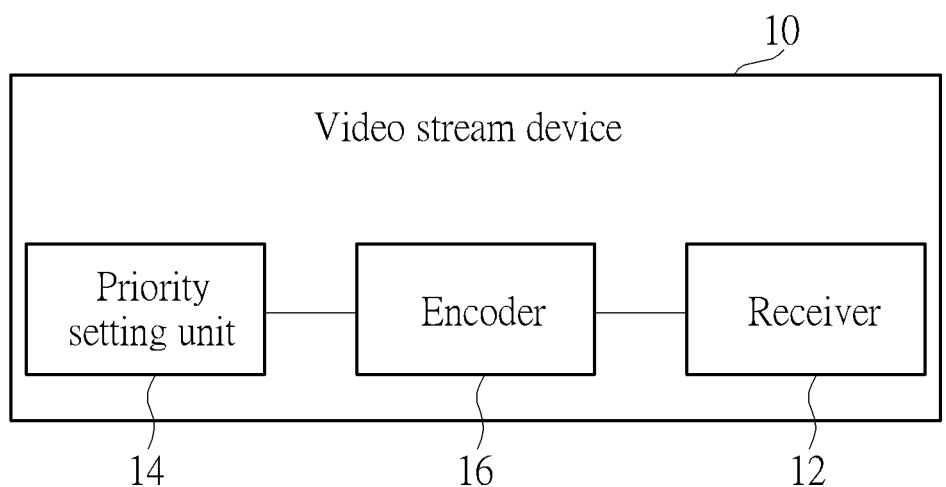
FIG. 1 is a functional block diagram of a video stream device according to an embodiment of the present invention.

Please refer to FIG. 1, which is a functional block diagram of a video stream device 10 according to an embodiment of the present invention. The video stream device 10 could preferably be a camera device (e.g. IP camera) for capturing a surveillance region (e.g. a parking lot) and providing video streams having surveillance video contents to achieve the real-time surveillance purpose, but not limited thereto. It means that the video stream device 10 could be other media stream apparatus for generating video streams. As shown in FIG. 1, the video stream device 10 includes a receiver 12, a priority setting unit 14, and an encoder 16. The receiver 12 is used for receiving image data. The priority setting unit 14 is used for setting a priority of each video stream. The encoder 16 could preferably be firmware, software, or hardware (e.g. SOC (System On Chip)) for video stream encoding. The encoder 16 is coupled to the receiver 12 and the priority setting unit 14. The encoder sets at least one effective stream parameter of each video stream according to the priority of each video stream, at least one predetermined stream parameter of each video stream and encoding power of the encoder 16. The encoder 16 encodes the image data received by the receiver 12 according to the effective stream parameter of each video stream to generate a plurality of video streams for live streaming or recording (e.g. the encoded video streams could be transmitted to a video stream receiver, such as a NVR (Network Video Recorder), or centralized monitors). Accordingly, the purpose that the encoding resource of the encoder can be dynamically allocated to the video streams with high priorities can be achieved.

Figure 2:
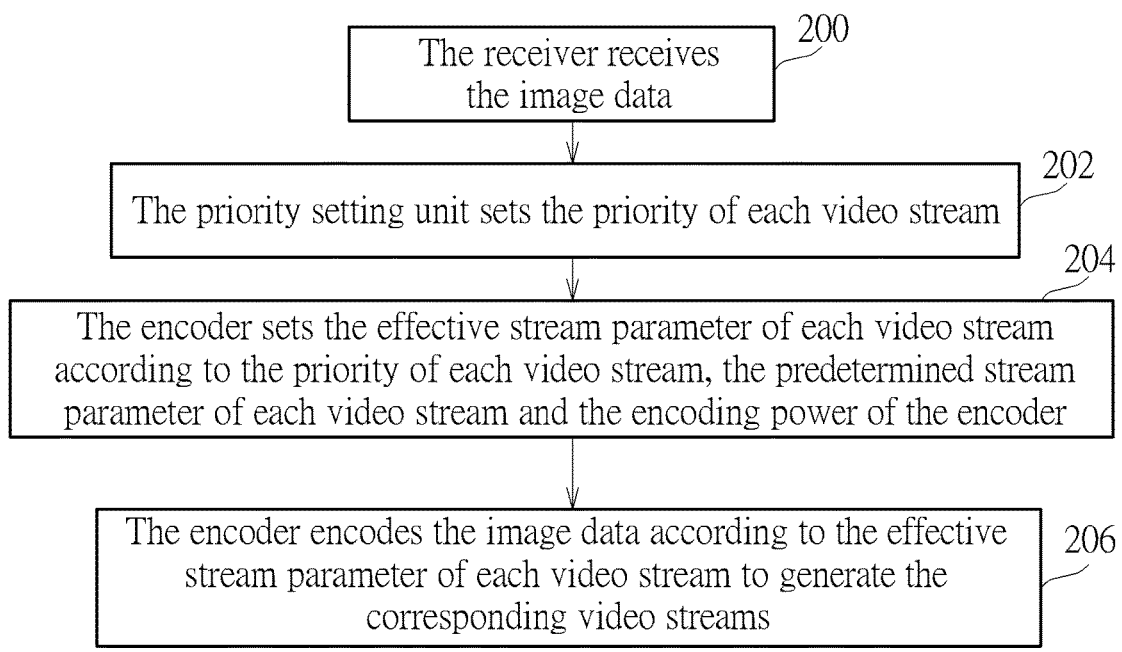
FIG. 2 is a flowchart of a video stream processing method according to an embodiment of the present invention.

A video stream processing method provided by the present invention is described as follows. Please refer to FIG. 1 and FIG. 2. FIG. 2 is a flowchart of the video stream processing method according to an embodiment of the present invention. The video stream processing method of the present invention includes the following steps.

Step 200: The receiver 12 receives the image data.

Step 202: The priority setting unit 14 sets the priority of each video stream.

Step 204: The encoder 16 sets the effective stream parameter of each video stream according to the priority of each video stream, the predetermined stream parameter of each video stream and the encoding power of the encoder 16.

Step 206: The encoder 16 encodes the image data according to the effective stream parameter of each video stream to generate the corresponding video streams.

More detailed description for the aforesaid steps is provided as follows in the condition that the video stream device 10 is requested to generate a first video stream and a second video stream. In Step 200, the video stream device 10 utilizes the receiver 12 to receive the image data corresponding to a surveillance region (e.g. a parking lot) for subsequent stream encoding of the encoder 16. Subsequently, in Step 202, the priority setting unit 14 performs a priority setting operation on the first video stream and the second video stream. In practical application, the priority setting unit 14 could preferably set the priorities of the first and second video streams respectively according to at least one of a user predefined value, access authorities of the first and second video streams, application scenarios of the first and second video streams, regions of interest corresponding to image contents provided by the first and second video streams, and any combination thereof. The priority setting unit 14 could adopt other priority setting method in another embodiment, such as setting a video stream with a video content having a group of more persons as a video stream with a high priority. It means that all setting methods for defining the priority of each video stream can be adopted by the present invention.

For example, the priority setting unit 14 could set the priority of each video stream according to the priority value predefined by the user. In practical application, if the user logs in the video stream device 10 as a system administrator, the priority setting unit 14 could directly set the priority of the corresponding video stream to a maximum level no matter what the priority predefined value of this video stream is.

Further, the priority setting unit 14 could also set a video stream having a high access authority as a video stream with a high priority. For example, a priority of a video stream corresponding to a request from a system administrator is higher than a priority of a video stream corresponding to a request from an anonymous user.

Further, the priority setting unit 14 could also set a video stream with high image quality as a video stream with a high priority. For example, a priority of a video stream with a high resolution for VCA (Video Content Analysis) is higher than a priority of a video stream with a low resolution for real-time surveillance.

Further, the priority setting unit 14 could also set a video stream having an ROI (Region of Interest) image (e.g. a surveillance image for a hall door region) as a video stream with a high priority, and the priority setting unit 14 could set an video stream having a wide-area image (e.g. a surveillance image for an entire hall region) as a video stream with a low priority. Further, the priority setting unit 14 could also set a video stream with a PTZ (Pan, Tile, Zoom) function as a video stream with a high priority.

After the aforesaid priority setting step is completed, the encoder 16 could set effective stream parameters of the first and second video streams according to the priorities and the predetermined stream parameters of the first and second video streams and the encoding power of the encoder 16 (Step 204). The predetermined stream parameters of the first and second video streams could preferably include a predetermined resolution and a predetermined frame rate, but not limited thereto. The encoding power of the encoder 16 could preferably be a maximum size of the encoded pixels of the encoder 16, which is defined as a product of an allowable maximum resolution and an allowable maximum frame rate which the encoder 16 can support in this embodiment.

For example, it is assumed that the first video stream is applied to VCA, the priority of the first video stream is set as 1, the second video stream is applied to real-time surveillance, and the priority of the second video stream is set as 2. In this embodiment, the priority setting unit 14 preferably adopts the design that a lower value represents a higher priority, but not limited thereto, meaning that the priority setting unit 14 could adopt the design that a higher value represents a higher priority in another embodiment. It is further assumed that an allowable maximum resolution and an allowable maximum frame rate which the encoder 16 can support are set as 2560*1920 and 30 respectively and a predetermined resolution and a predetermined frame rate of the first video stream are set as 2560*1920 and 30. It is further assumed that the predetermined time interval is set as one second, a predetermined resolution and a predetermined frame rate of the second video stream are set as 640*360 and 30, and a minimum resolution and a minimum frame rate of the first and second video streams are set as 640*360 and 5 respectively (but not limited thereto). It means that the minimum setting could vary with the practical application of the video stream device 10. For example, the minimum resolution and the minimum frame rate could be set as 0 to make the video stream device 10 not to output the corresponding video stream with a low priority.

Accordingly, the encoder 16 could calculate the sum of two product. One is a product of the predetermined resolution and the predetermined frame rate of the first video stream. Another one is the product of the predetermined resolution and the predetermined frame rate of the second video stream. Thus, the encoder 16 could generate the predetermined sizes of the encoded pixels of the first and second video streams (i.e. 2560*1920*30+640*360*30=154368000, which could be regarded as the predetermined sizes of the encoded pixels of the first and second video streams needed to be encoded in one second). The encoder 16 could further calculate the minimum sizes of the encoded pixels of the first and second video streams (i.e. 640*360*5=1152000, which could be regarded as the minimum size of the encoded pixels of the first video stream and the minimum size of the encoded pixels of the second video stream needed to be encoded individually in one second). The encoder 16 could further calculate the maximum size of the encoded pixels of the encoder 16 (i.e. 2560*1920*30=147456000, which could be regarded as the maximum pixel size capacity of the encoder 16 to encode in one second).

Via the aforesaid calculation result, the encoder 16 could determine the sum of the predetermined sizes of the encoded pixels of the first and second video streams is larger than the encoding power of the encoder 16 (i.e. the maximum size of the encoded pixels of the encoder 16). Accordingly, the encoder 16 could calculate the effective sizes of the encoded pixels of the first and second video streams according to the maximum size of the encoded pixels of the encoder 16, the minimum sizes of the encoded pixels of the first and second video streams, and the priorities of the first and second video streams. On the contrary, if the encoder 16 determines that the sum of the predetermined sizes of the encoded pixels of the first and second video streams is less than the encoding power of the encoder 16, it means the encoding power of the encoder 16 is enough to satisfy the predetermined pixel encoding requirements of the first and second video streams. Accordingly, the encoder could set the predetermined stream parameters of the first and second video streams as the effective stream parameters of the first and second video streams respectively.

After the encoder 16 determines that the sum of the predetermined sizes of the encoded pixels of the first and second video streams is larger than the encoding power of the encoder 16, the encoder 16 could further determine that the priority of the second video stream is lower than the priority of the first video stream. At this time, the encoder 16 preferentially allocates the aforesaid minimum size of the encoded pixels to each video stream. Then, the encoder 16 performs remaining encoding power allocation according to the priority of each video stream. For example, the encoder 16 could preferentially allocate the remaining encoding power of the encoder 16 (i.e. a difference of the maximum size of the encoded pixels of the encoder 16 and the sum of the minimum sizes of the encoded pixels of the first and second video streams) to the first video stream. That is, the encoder 16 could set a sum of the remaining size of the encoded pixels of the encoder 16 and the minimum size of the encoded pixels of the first video stream (i.e. (147456000−1152000−1152000)+1152000=146304000) as the effective size of the encoded pixels of the first video stream. Further, the encoder 16 could set the minimum size of the encoded pixels of the second video stream (i.e. 1152000) as the effective size of the encoded pixels of the second video stream (but not limited thereto). As such, the encoder 16 could calculate the effective stream parameter of the first video stream according to the effective size of the encoded pixels of the first video stream. That is, the encoder 16 could calculate the effective resolution and the effective frame rate of the first video stream as 2560*1920 and 29.7 (146304000/(2560*1920)=29.7) respectively. In this embodiment, the encoder 16 could adopt the calculation design that the predetermined resolution requirement of the first video stream is preferentially satisfied, but not limited thereto. It means that the encoder 16 could adopt the calculation design that the predetermined frame rate requirement of the first video stream is preferentially satisfied in another embodiment.

On the contrary, in practical application, if the encoder 16 determines that the sum of the remaining size of the encoded pixels of the encoder 16 and the minimum size of the encoded pixels of the first video stream is larger than the predetermined size of the encoded pixels of the first video stream, it means that the maximum size of the encoded pixels of the encoder 16 is enough to satisfy the predetermined pixel encoding requirement of the first video stream. The encoder 16 could directly set the predetermined stream parameter of the first video stream as the effective stream parameter of the first video stream. Subsequently, the encoder 16 could further allocate a last remaining size of the encoded pixels of the encoder 16 to the second video stream with the minimum size of the encoded pixels until all the maximum size of the encoded pixels of the encoder 16 has been allocated or has satisfied the pixel encoding requirement of each video stream. The last remaining size of the encoded pixels of the encoder 16 is a difference of the sum of the remaining size of the encoded pixels of the encoder 16 and the minimum size of the encoded pixels of the first video stream and the predetermined size of the encoded pixels of the first video stream.

Finally, in Step 206, the video stream device 10 could utilize the encoder 16 to encode the image data according to the aforesaid effective stream parameters of the first and second video streams. Accordingly, the encoder 16 can generate the first video stream in which the effective resolution is 2560*1920 and the effective frame rate is 29.7 and the second video stream in which the effective resolution is 640*360 and the effective frame rate is 5 for live streaming or recording (e.g. transmitting the encoded first and second video streams to a stream receiving terminal or centralized monitors).

To be noted, during the stream transmission process, if transmission of one video stream has been completed but the other has not, the video stream device 10 could utilize the encoder 16 to recalculate the effective stream parameter of the other video stream according to the encoding power of the encoder 16. For example, it is assumed that transmission of the first video stream has been completed. Since the encoding power of the encoder 16 is larger than the predetermined size of the encoded pixels of the second video stream, it means the encoding power of the encoder 16 is enough to satisfy the predetermined pixel encoding requirement of the second video stream. The encoder 16 could set the predetermined stream parameter of the second video stream as the effective stream parameter of the second video stream instead to generate the second video stream in which the effective resolution is 640*360 and the effective frame rate is 30.

Furthermore, the step of the encoder 16 determining whether the sum of the predetermined sizes of the encoded pixels of the first and second video streams is larger than the encoding power of the encoder 16 is an omissible step. That is, no matter whether the sum of the predetermined sizes of the encoded pixels of the first and second video streams is larger than the encoding power of the encoder 16, the encoder 16 could directly allocate the minimum size of the encoded pixels to each video stream. Subsequently, the encoder 16 could allocate the remaining size of the encoded pixels of the encoder 16 according to the priority of each video stream. Accordingly, the video stream processing method of the present invention is simplified.

In such a manner, compared with the prior art, the present invention adopts the video stream processing method for dynamically adjusting the effective stream parameter of each video stream according to the priority of each video stream, to achieve the purpose that the video stream device could preferentially allocate the pixel encoding resource of the encoder to a video stream with a high priority. In other words, the present invention can solve the prior art problem that the camera device could not provide real-time video streams approximately matching the stream parameters predetermined by the user when the sum of the size of the encoded pixels of the video streams is larger than the encoding power of the camera device. Accordingly, the present invention can surely prevent image quality of a video stream with high importance (e.g. a surveillance video stream for an important surveillance region) from being influenced by interference of other video streams with low importance, so as to improve reliability of the video stream device in providing the video stream of high importance.

If the encoder 16 determines that the first and second video streams have the same priority, the encoder 16 could calculate the effective sizes of the encoded pixels of the first and second video streams respectively according to the minimum sizes of the encoded pixels of the first and second video streams and a ratio of the predetermined sizes of the encoded pixels of the first and second video streams. As for the related description for calculation of the effective size of the encoded pixels of each video stream, it could be reasoned by analogy according to the aforesaid embodiment and omitted herein. For example, the encoder 16 could allocate the sum of the remaining size of the encoded pixels of the encoder 16 and the minimum sizes of the encoded pixels of the first and second video streams according to the aforesaid ratio for respectively calculating the effective sizes of the encoded pixels of the first and second image streams, but not limited thereto.

Furthermore, if the user amends the priority or the predetermined stream parameter of the first video stream (or the second video stream), the video stream device 10 could utilize the encoder 16 to recalculate the effective stream parameter of each video stream according to the encoding power of the encoder 16, to generate the corresponding video streams for properly satisfying the user needs.

Figure 3:
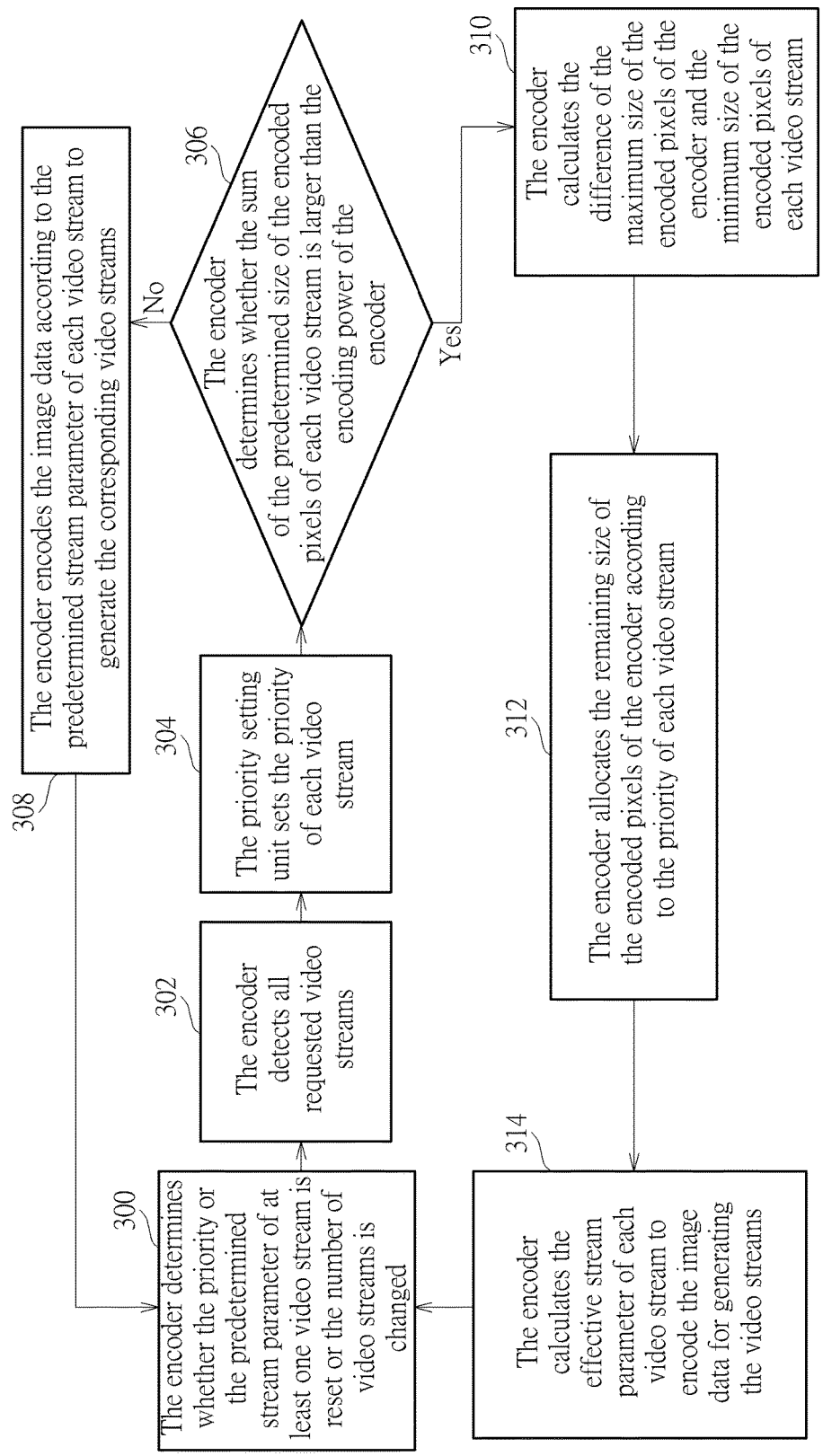
FIG. 3 is a flowchart of a video stream processing method according to another embodiment of the present invention.

In practical application, if the number of video streams is changed (e.g. the video stream device 10 is requested to generate a new video stream) or the predetermined stream parameter (or the priority) of at least one video stream is reset, the video stream device 10 could utilize the encoder 16 to recalculate the effective stream parameter of each video stream. For example, please refer to FIG. 3, which is a flowchart of a video stream processing method according to another embodiment of the present invention. As shown in FIG. 3, the encoder 16 needs to preferentially determine whether the number of video streams is changed or the predetermined stream parameter or the priority of at least one video stream is reset (Step 300). More detailed description for the steps in FIG. 3 is provided as follows. It is assumed that a new third video stream is requested and a priority of the third video stream is between the priorities of the first and second video streams (i.e. the priorities of the first, second, and the third video streams are different). It is further assumed that a predetermined resolution and a predetermined frame rate of the third video stream are set as 2560*1920 and 10 respectively and a minimum resolution and a minimum frame rate of the third video stream are set as 640*360 and 5 respectively. As for the related description for other derived embodiments (e.g. a new fourth video stream is requested), it could be reasoned by analogy according to the following description and omitted herein.

After the encoder 16 detects all requested video streams (Step 302) and the priority setting unit 14 sets the priority of each video stream (Step 304), the encoder 16 could determine whether a sum of the predetermined sizes of the encoded pixels of the first, second and third video streams is larger than the encoding power of the encoder 16 (Step 306). If the encoder 16 determines the sum of the predetermined sizes of the encoded pixels of the first, second and third video streams is less than the encoding power of the encoder 16, the encoder 16 could set the predetermined stream parameters of the first, second and third video streams as the effective stream parameters of the first, second and third video streams (Step 308). As such, the video stream processing method is completed.

On the contrary, if the encoder 16 determines the sum of the predetermined sizes of the encoded pixels of the first, second and third video streams is larger than the encoding power of the encoder 16, the encoder 16 calculates a difference of the maximum size of the encoded pixels of the encoder 16 and a sum of the minimum sizes of the encoded pixels of the first, second and third video streams (Step 310). It means the encoder 16 preferentially allocates the minimum size of the encoded pixels to each video stream. Subsequently, the encoder 16 allocates the remaining size of the encoded pixels of the encoder 16 according to the priority of each video stream (Step 312). For example, the encoder 16 could allocate a sum of the remaining size of the encoded pixels of the encoder 16 and the minimum size of the encoded pixels of the first video stream (i.e. (147456000−1152000−1152000−1152000)+1152000=145152000) to the first video stream as the effective size of the encoded pixels of the first video stream. The encoder 16 could allocate the minimum sizes of the encoded pixels (i.e. 1152000) to the second and third video streams respectively as the effective sizes of the encoded pixels of the second and third video streams (but not limited thereto). In such a manner, the encoder 16 could calculate the effective stream parameters of the first, second and third video streams according to the aforesaid effective sizes of the encoded pixels. Accordingly, the encoder 16 could encode the image data to generate the first video stream in which the effective resolution is 2560*1920 and the effective frame rate is 29.5 (145152000/(2560*1920)=29.5) and the second and third video streams in which the effective resolution is 640*360 and the effective frame rate is 5 (Step 314).

To be noted, in Step 312, the encoder 16 could further determine whether the sum of the remaining size of the encoded pixels of the encoder 16 and the minimum size of the encoded pixels of the first video stream is larger than the predetermined size of the encoded pixels of first video stream. If the encoder 16 determines that the aforesaid sum is larger than the predetermined size of the encoded pixels of the first video stream, the encoder 16 could directly set the predetermined stream parameter of the first video stream as the effective stream parameter of the first video stream. The encoder 16 could further allocate a difference of the aforesaid sum and the predetermined size of the encoded pixels of the first video stream to the third video stream since the priority of the third video stream is higher than the priority of the second video stream. At this time, if the encoder 16 could still satisfy the predetermined pixel encoding requirement of the third video stream, the encoder 16 could further allocate the last remaining size of the encoded pixels to the second video stream. The related description for allocation of size of the encoded pixels could be reasoned by analogy according to the aforesaid description and omitted herein.

Moreover, in Step 312, it is assumed that at least two video streams have the same priority (e.g. the priority of the third video stream is equal to the priority of the first video stream but larger than the priority of the second video stream). The encoder 16 could allocate a sum of the remaining size of the encoded pixels of the encoder 16 and the minimum sizes of the encoded pixels of the first and third video streams (i.e. (147456000−1152000−1152000−1152000)+1152000+1152000=146304000) to the first and third video streams. Further, the encoder 16 could allocate the aforesaid sum to the first and third video streams according to a ratio of the predetermined sizes of the encoded pixels of the first and third video streams (i.e. 2560*1920*30:2560*1920*10=3:1), to calculate the effective sizes of the encoded pixels of the first and third video streams respectively. Furthermore, the encoder 16 could allocate the minimum size of the encoded pixels of the second video stream to the second video stream to calculate the effective size of the encoded pixels of the second video stream. In such a manner, the purpose that the pixel encoding resource of the encoder 16 could preferentially be allocated to a video stream with a high priority can be achieved.

In brief, according to the aforesaid effective stream parameters, the encoder 16 could generate the first video stream in which the effective resolution is 2560*1920 and the effective frame rate is 22.3 ((146304000*3/4)/(2560*1920)=22.3). The encoder 16 could generate the third video stream in which the effective resolution is 2560*1920 and the effective frame rate is 7.4 ((146304000*1/4)/

(2560*1920)=7.4). The encoder 16 could generate the second video stream in which the effective resolution is 640*360 and the effective frame rate is 5. As for the related description for other derived embodiments, it could be reasoned by analogy according to the aforesaid embodiments. For example, it is assumed that the encoder 16 determines that the aforesaid sum is larger than a sum of the predetermined sizes of the encoded pixels of the first and third video streams, meaning that the maximum size of the encoded pixels of the encoder 16 is enough to satisfy the predetermined pixel encoding requirements of the first and third video streams having the same priority. Subsequently, the encoder 16 could further allocate a last remaining size of the encoded pixels of the encoder 16 to the second video stream having the second highest priority until all the maximum size of the encoded pixels of the encoder 16 has been allocated or has satisfied the pixel encoding requirement of each video stream. The last remaining size of the encoded pixels of the encoder 16 is a difference of the sum of the remaining size of the encoded pixels of the encoder 16 and the minimum sizes of the encoded pixels of the first and third video streams and the predetermined sizes of the encoded pixels of the first and third video streams.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video stream processing method suitable for a video stream device, the video stream device having an encoder for generating a plurality of video streams, the video stream processing method comprising:
   receiving image data;
   setting a priority of each video stream;
   setting an effective stream parameter of each video stream according to the priority of each video stream, a predetermined stream parameter of each video stream, and an encoding power of the encoder, the predetermined stream parameter of each video stream comprising a predetermined resolution and a predetermined frame rate of each video stream, and the encoding power of the encoder being defined as a product of an allowable maximum resolution the encoder can support and an allowable maximum frame rate the encoder can support in a predetermined time interval for generating a maximum size of encoded pixels of the encoder; and
   encoding the image data according to the effective stream parameter of each video stream for generating the plurality of video streams.

2. The video stream processing method of claim 1, wherein the step of setting the priority of each video stream comprises:
   setting the priority of each video stream according to at least one of a user predefined value, an access authority of each video stream, an application scenario of each video stream, a region of interest corresponding to an image content provided by each video stream, and any combination thereof.

3. The video stream processing method of claim 1, wherein the step of setting the effective stream parameter of each video stream comprises:
   calculating a product of the predetermined resolution and the predetermined frame rate in the predetermined time interval for generating a predetermined size of encoded pixels of each video stream;
   calculating a product of a minimum resolution and a minimum frame rate in the predetermined time interval for generating a minimum size of encoded pixels of each video stream;
   calculating an effective size of encoded pixels of each video stream when a sum of the predetermined size of the encoded pixels of each video stream is larger than the encoding power of the encoder, the effective size of the encoded pixels being calculated according to the maximum size of the encoded pixels of the encoder in the predetermined time interval, the minimum size of the encoded pixels of each video stream in the predetermined time interval, and the priority of each video stream; and
   calculating and setting the effective stream parameter of each video stream according to the effective size of the encoded pixels of each video stream.

4. The video stream processing method of claim 3, wherein the step of calculating the effective size of the encoded pixels of each video stream comprises:
   allocating the corresponding minimum size of the encoded pixels to each video stream to calculate a remaining size of encoded pixels of the encoder;
   allocating the remaining size of the encoded pixels according to the priority of each video stream; and
   calculating a sum of the minimum size of the encoded pixels and an allocated remaining size of encoded pixels of each video stream for generating the effective size of the encoded pixels of each video stream.

5. The video stream processing method of claim 4, wherein the remaining size of the encoded pixels is allocated in a manner of preferentially satisfying the predetermined size of the encoded pixels of at least one video stream with a high priority.

6. The video stream processing method of claim 4, wherein when at least two of the plurality of video streams have the same priority, the video stream processing method further comprises:
   calculating a ratio of the predetermined sizes of the encoded pixels of the at least two of the plurality of video streams; and
   allocating the remaining size of the encoded pixels of the encoder according to the ratio.

7. The video stream processing method of claim 1, wherein when the number of the plurality of video streams is changed or the predetermined stream parameter or the priority of at least one video stream is reset, the video stream processing method further comprises:
   recalculating the effective stream parameter of each video stream according to the priority of each video stream, the predetermined stream parameter of each video stream and the encoding power of the encoder.

8. A video stream device comprising:
   a receiver for receiving an image data;
   an encoder for generating a plurality of video streams; and
   a priority setting unit for setting a priority of each video stream;
   wherein the encoder is coupled to the receiver and the priority setting unit for setting an effective stream parameter of each video stream according to the priority of each video stream, a predetermined stream parameter of each video stream and an encoding power of the encoder and encoding the image data according to the effective stream parameter of each video stream for generating the plurality of video streams, the predetermined stream parameter of each video stream comprises a predetermined resolution and a predetermined frame rate of each video stream, and the encoding power of the encoder is defined as a product of an allowable maximum resolution the encoder can support and an allowable maximum frame rate the encoder can support in a predetermined time interval for generating a maximum size of encoded pixels of the encoder.

9. The video stream device of claim 8, wherein the priority setting unit sets the priority of each video stream according to at least one of a user predefined value, an access authority of each video stream, an application scenario of each video stream, a region of interest corresponding to an image content provided by each video stream, and any combination thereof.

10. The video stream device of claim 8, wherein the encoder calculates a product of the predetermined resolution and the predetermined frame rate in the predetermined time interval to generate a predetermined size of encoded pixels of each video stream and calculates a product of a minimum resolution and a minimum frame rate in the predetermined time interval to generate a minimum size of encoded pixels of each video stream; when the sum of the predetermined size of the encoded pixels of each video stream is larger than the encoding power of the encoder, the encoder calculates an effective size of encoded pixels of each video stream according to the maximum size of the encoded pixels of the encoder in the predetermined time interval, the minimum size of the encoded pixels of each video stream in the predetermined time interval, and the priority of each video stream; the encoder calculates and setting the effective stream parameter of each video stream according to the effective size of the encoded pixels of each video stream.

11. The video stream device of claim 10, wherein the encoder allocates the corresponding minimum size of the encoded pixels to each video stream to calculate a remaining size of encoded pixels of the encoder, the encoder allocates the remaining size of the encoded pixels according to the priority of each video stream, and the encoder calculates a sum of the minimum size of the encoded pixels and an allocated remaining size of encoded pixels of each video stream for generating the effective size of the encoded pixels of each video stream.

12. The video stream device of claim 11, wherein the remaining size of the encoded pixels is allocated in a manner of preferentially satisfying the predetermined size of the encoded pixels of at least one video stream with a high priority.

13. The video stream device of claim 11, wherein when at least two of the plurality of video streams have the same priority, the encoder calculates a ratio of the predetermined sizes of the encoded pixels of the at least two of the plurality of video streams and then allocates the remaining size of the encoded pixels of the encoder according to the ratio.

14. The video stream device of claim 8, wherein when the number of the plurality of video streams is changed or the predetermined stream parameter or the priority of at least one video stream is reset, the encoder recalculates the effective stream parameter of each video stream according to the priority of each video stream, the predetermined stream parameter of each video stream and the encoding power of the encoder.

* * * * *